May 10, 1966  G. D. HOOPER  3,250,831
MAGNETIC MATERIAL
Filed Dec. 20, 1962
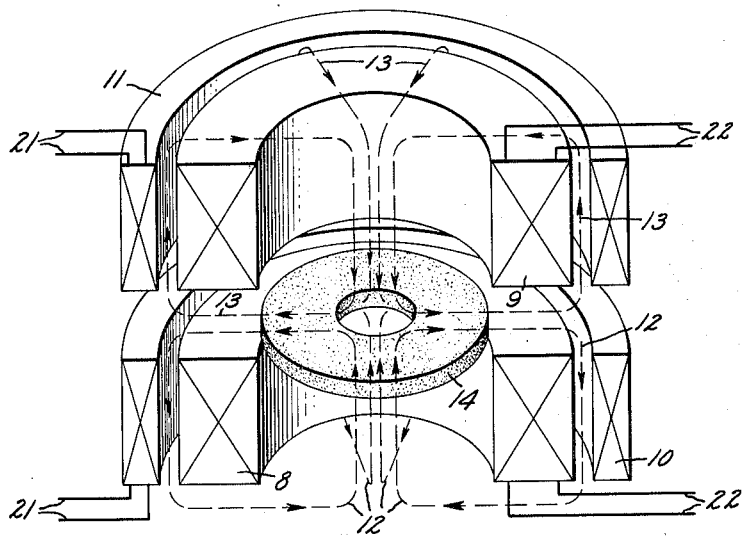
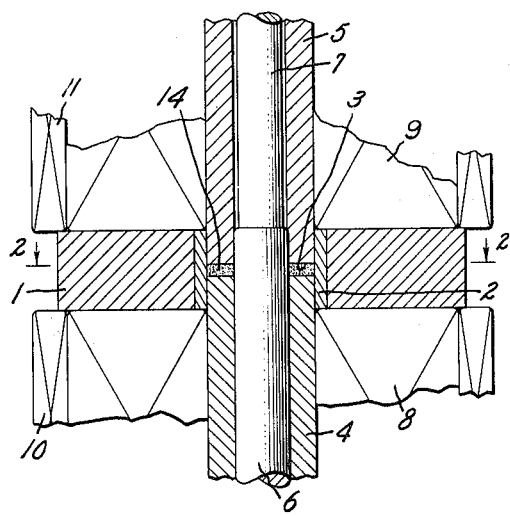
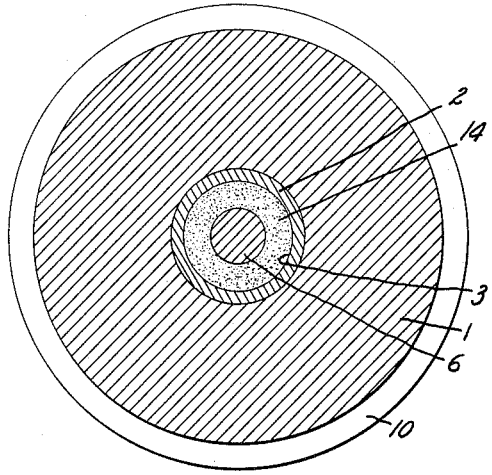
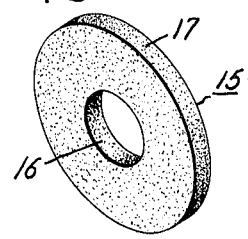
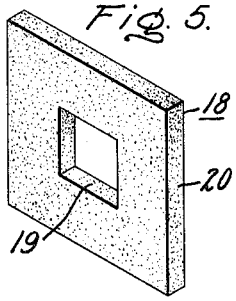
Inventor:
George D. Hooper,
by
His Attorney.

`United States Patent Office`

3,250,831
Patented May 10, 1966

---

3,250,831
MAGNETIC MATERIAL
George D. Hooper, Greenville, Mich., assignor to General Electric Company, a corporation of New York
Filed Dec. 20, 1962, Ser. No. 246,095
2 Claims. (Cl. 264—24)

This invention relates to a process and apparatus for the production of radially-oriented, ring-shaped magnets from magnetic powder comprising elongated, single domain, magnetic particles.

The production of anisotropic magnets has been known for many years. An "anisotropic magnet" is defined as a magnet having one principal direction of magnetization or, more specifically, as a magnet in which the magnetic properties in one direction are appreciably higher than the magnetic properties in a direction perpendicular to the preferred direction. Cast Alnico magnets having directional properties are produced by subjecting the solid castings to a heat treatment in a magnetic field. Such a process is described, for example, in Jonas Patent 2,295,082 wherein the direction of the heat-treating field is made to coincide with the direction of final magnetization.

There has recently been developed a new type of magnetic material composed of elongated, single domain particles. In addition to vastly improved magnetic properties, magnetic materials of such single domain particles possess the advantage of being relatively easily pressed into a variety of shapes and configurations.

Such single domain particles are highly anisotropic and hence must be aligned to obtain optimum magnetic properties. U.S. Patent 2,999,271, assigned to the same assignee as the present invention, discloses a process for orienting and compacting such single domain magnetic material by simultaneously applying an alternating and direct current field to a quantity of single domain magnetic powder and compacting the powder while the direct field remains energized. This process may be used for orienting magnets of many shapes and configurations. However, attempts to radially orient ring-shaped magnets encounter certain difficulties. To radially orient such magnets, so that the inner diameter forms one pole and the outer diameter forms the other pole, requires the direct current aligning field to form a path of very special configuration.

It is an object of the present invention to provide a method for producing radially-oriented, ring-shaped magnet structures composed of single domain magnetic particles. It is an additional object of this invention to provide an apparatus for producing such radially-oriented magnet structures.

The present invention utilizes the process set forth in the above-identified U.S. Patent 2,999,271 in that an alternating and direct current field are simultaneously applied to a quantity of single domain magnetic powder and the powder is compacted into a magnetic structure while the direct current field remains energized. However, in addition, the magnetic powder is retained in a ring-shaped cavity and the direct current field is passed in a radial direction through a radial portion of the cavity and magnetic powder. The direction of the direct current field is created by the confluence of two direct current fields of opposite direction meeting at the radial plane of the cavity. As used in the specification and claims, "ring-shaped" is intended to include magnet shapes containing a central cavity or hole surrounded by a closed magnet structure. Such magnets are usually, but not always, annular or washer-shaped. Ring-shaped, radially-oriented magnets find many uses. One such use for which they are particularly adapted is as small speaker magnets.

The invention will be more clearly understood from the following description taken in connection with the accompanying drawing in which FIGURE 1 is an elevational, cross-sectional view showing the central portion of a compacting press useful in the invention;

FIGURE 2 is a planar, cross-sectional view taken along the lines 2—2 of FIGURE 1;

FIGURE 3 is a perspective, partially cross-sectional view of a pair of A.-C. and D.-C. poles and a ring-shaped magnet showing their relationship in a compacting press and the direction of flow of the direct current field, and FIGURES 4 and 5 are perspective views of two ring-shaped magnet structures which may be radially oriented in accordance with the practice of the invention.

Referring to FIGURES 1 and 2 of the drawing, the compacting press comprises an annular die member 1 fabricated from steel. The inner diameter of die member 1 contains a concentrically-mounted annular insert 2 made from material of low magnetic permeability so that the magnetic powder may be aligned more uniformly without the presence of undesirable agglomerates. A die cavity 3 is formed within die member 1 by lower punch 4 and upper punch 5. The punches are of a hard, nonmagnetic material such as those sold under the trademark Stellite. The core of the ring-shaped magnet is formed by core pin 6 located centrally of the lower punch. The core pin 6 mates with pin 7 which is located centrally of upper punch 5. Core pin 6 is made of a material of high magnetic permeability such as permendur, iron or steel. Pin 7 is also made of a material of high magnetic permeability such as iron. Surrounding lower punch 4 and upper punch 5 are two annular D.-C. coils 8 and 9, respectively, coaxially aligned with the die; D.-C. coil 8 being located axially below and D.-C. coil 9 axially above die cavity 3. Surrounding each D.-C. coil is an outer annular A.-C. coil 10 and 11, coaxially aligned with the D.-C. coils and the die. The A.-C. and D.-C. coils are mounted approximately the same axial distance above and below, respectively, a radial plane passing through the center of die cavity 3.

The details and the relationship of the various parts of the compacting press to the direction of flow of the direct current field are more clearly indicated in FIGURE 3. As there shown, the D.-C. coils when energized form a direct current field 12 in one direction around the lower D.-C. coil and a direct current field 13 in an opposite direction around the upper D.-C. coil. The fields meet in the radial plane of the die cavity and pass through a radial portion of the die cavity and a radial portion of the magnetic material being compacted and oriented therein into ring-shaped magnet 14. While the A.-C. field direction is not shown, the A.-C. field will pass through the die cavity and magnetic material along a path through the die and magnetic material substantially coincident with that of the D.-C. field. The D.-C., rather than the A.-C., field serves to align the magnetic powder so that the particular path and direction of the A.-C. field is not critical except that it must, of course, pass through the magnetic powder. Leads 21 and 22 lead to a suitable A.-C. and D.-C. source respectively.

FIGURES 4 and 5 illustrate several types of ring-shaped magnets which may be oriented in accordance with the practice of the invention. FIGURE 4 shows a washer-shaped permanent magnet 15 in the form of an annulus in which inner diameter 16 may, for example, be a north pole and outer diameter 17 is a south pole. Similarly, FIGURE 5 shows a rectangular-shaped magnet 18 with one pole at its inner perimeter 19 and a second pole at its outer perimeter 20.

In the operation of the press, the bottom punch is adjusted so that the center line of the die cavity is located midway between the two coaxially aligned D.-C. coils. The powder is then charged into the annular die cavity formed by the bottom punch, the wall of the die and the core pin. The top punch is entered into the die cavity and before any compaction occurs, the A.-C. field is energized to agitate the powder. The D.-C. field is then energized at least a second or two before compaction begins. The A.-C. and D.-C. fields need not be energized at the same moment, but both fields must be on simultaneously for at least a portion of the time prior to the compaction step. The D.-C. field will then form the radial flux pattern shown in cross-section in FIGURE 3. The top punch is then brought further into the die cavity to compact the magnetic powder while the fields remain energized. If desired, the A.-C. field may be partially or wholly de-energized during compaction, but the D.-C. field must remain energized during compaction to retain powder orientation. After compaction of the powder, the fields are de-energized and the compacted and oriented magnet structure ejected by lifting the bottom punch.

For optimum results, the D.-C. field strength should be at least 3000 and preferably about 6000 gauss, and should exceed the A.-C. field strength, at least when compaction begins. The strength of the two D.-C. fields should be approximately the same. For best results, the D.-C. field should be twice as great as the A.-C. field strength. All field strength measurements as herein set forth are as measured along a plane equidistant between the respective pole pieces.

The present invention is directed to the radial orientation and compaction of magnetic material composed of elongated, single domain, magnetic particles of iron, cobalt, nickel or magnetic alloys of iron, cobalt and nickel. Such magnetic materials and their preparation are disclosed in U.S. Patent 2,974,104, assigned to the same assignee as the present invention. As there disclosed, the elongated, single domain, magnetic particles are prepared by electrolytic deposition into a molten metal cathode, such as mercury. The resulting slurry of magnetic particles and mercury is then heat-treated to optimize the physical shape of the particles. A nonmagnetic matrix, such as lead, and a coating material for the particles, such as antimony, may then be added to the slurry, after which the slurry is again heat-treated to promote formation of the antimonide. The coated, elongated, single domain particles are then pressed and aligned in a D.-C. field together with the mercury and matrix material. The mercury is removed from the preforms by distillation and the preforms are prepared for orientation and compaction by grinding into a powder.

The following examples illustrate the practice of the invention.

*Example 1*

Fine particle iron was electrodeposited into a mercury cathode to form a slurry of mercury and the iron particles as set forth in the above-referred-to U.S. Patent 2,974,104. The slurry, containing 96.5 pounds of mercury and 3.5 pounds of iron particles, was heat-treated for 14 minutes at 175° C. While still hot, 6.5 pounds of lead as a matrix material and 0.50 pound of antimony as a coating material were added to the slurry. The resultant mixture was heat-treated for an additional period of 15 minutes for 475° C. After cooling, the mixture was pressed at a pressure of 10,000 p.s.i. in a die in the presence of a D.-C. magnetic field of 4000 gauss to align the elongated iron particles in the direction of the field, to form preforms of the particles and to reduce the mercury content to about 80 percent of its original amount.

Essentially all of the remaining mercury was then removed by distilling the material at a pressure of about 1 mm. of mercury for one hour at 350° C. This reduced the mercury to about 2.0 percent by weight of its original amount. The preform thus pressed was ground and completely mixed to yield a powder of uniform consistency. The bulk of the powder had a screen analysis between approximately −20 and +170 mesh.

*Example 2*

Twenty grams of powder prepared as set out in Example 1 were loaded into the die cavity of a compacting press. The compacting pressure was 40 tons per square inch. The bottom punch was located in such a manner that the magnetic powder rested midway between the upper and lower A.-C. and D.-C. coils. The top punch was entered into the die cavity and the A.-C. coils were energized and 0.2 second later the D.-C. coils were energized while the powder still remained loose in the die cavity. The D.-C. coils were operated at 90 amperes and the A.-C. coils were operated at 100 amperes and 60 cycles. The magnet was pressed into its final shape while the A.-C. and D.-C. fields remained energized. The D.-C. field strength was 6000 gauss and the A.-C. field strength 3000 gauss; both as measured along a plane equidistant between the A.-C. and D.-C. pole pieces. After termination of compaction, the fields were de-energized and the magnetic structure removed. The directionality of the compacted magnet was essentially the same as the directionality achieved with bar-shaped magnet structures when oriented in accordance with the process set forth in the above U.S. Patent 2,999,271.

The invention may also be used for the radial orientation and compaction of ring-shaped magnets of oxidized, elongated, single domain particles of iron and cobalt. Such magnetic material is described in copending application S.N. 69,810, filed November 17, 1960, now U.S. Patent 3,156,650 and assigned to the assignee of the present invention.

What I claim as new and desire to secure by Letters Patent of the United States is:

1. A process for the radial orientation and compaction of magnetic powder comprising elongated, single domain, magnetic particles into a radially-oriented, ring-shaped magnet structure, said process comprising simultaneously passing an alternating current and a direct current field through a quantity of said magnetic powder retained in a stationary ring-shaped cavity, said direct current field passing in a radial direction and through a radial portion only of said cavity and said magnetic powder, the direction of said direct current field resulting from the confluence of two direct current fields of opposite direction meeting at the center of the radial plane of said cavity, and compacting said powder while said direct current field remains energized to form a radially-oriented, ring-shaped magnet structure.

2. An apparatus for the orientation and compaction of magnetic powder comprising elongated, single domain, magnetic particles into radially-oriented, ring-shaped magnet structures, said apparatus comprising a die having a ring-shaped cavity, means for compacting magnetic powder within said die cavity, two direct current and at least one alternating current coils coaxially aligned with said die cavity, means for supplying direct current to said direct current coils so that direct current fields of opposite direction may be created around said direct current coils, one of said direct current coils being located axially above and the other of said direct current coils being located axially below said die cavity so that said direct current fields of opposite direction will meet and pass radially through said die cavity, and means for supplying alternating current to said alternating current coil so that an alternating current field passes through said die cavity.

References Cited by the Examiner

UNITED STATES PATENTS

| 1,930,788 | 10/1933 | Buckner | 264—24 |
| 2,295,294 | 9/1942 | Ross. | |
| 2,849,312 | 8/1958 | Peterman | 264—108 X |
| 2,903,329 | 9/1959 | Weber | 18—47 |
| 2,964,793 | 12/1960 | Blume | 264—24 |
| 2,999,271 | 9/1961 | Falk et al. | 264—24 |
| 2,999,275 | 9/1961 | Blume | 264—108 X |
| 3,021,230 | 2/1962 | Deriavd | 264—24 X |
| 3,066,355 | 12/1962 | Schloemann et al. | 264—24 |
| 3,079,639 | 3/1963 | Gordon | 264—24 |
| 3,085,291 | 4/1963 | Haes et al. | 18—16.5 |

ALEXANDER H. BRODMERKEL, *Primary Examiner.*

J. H. WOO, *Assistant Examiner.*